United States Patent [19]

Ross, Jr.

[11] Patent Number: 4,927,718
[45] Date of Patent: May 22, 1990

[54] NOVEL AIR ELECTRODE FOR METAL-AIR BATTERY WITH NEW CARBON MATERIAL AND METHOD OF MAKING SAME

[75] Inventor: Philip N. Ross, Jr., Kensington, Calif.

[73] Assignee: The United States of America as represented by the United States Department of Energy, Washington, D.C.

[21] Appl. No.: 209,397

[22] Filed: Jun. 21, 1988

[51] Int. Cl.$^5$ .......................... H01M 4/86; C09C 1/56
[52] U.S. Cl. ......................................... 429/44; 429/45; 423/449; 423/460; 502/101
[58] Field of Search ................... 429/44, 45; 423/449, 423/460; 502/101

[56] References Cited

U.S. PATENT DOCUMENTS

| | | | |
|---|---|---|---|
| 2,582,764 | 1/1952 | Bailey | 423/449 |
| 3,158,510 | 11/1964 | Talvenheimo | |
| 3,870,565 | 3/1975 | Bonnemay et al. | |
| 4,064,207 | 12/1977 | DeCrescente et al. | 423/447.7 X |
| 4,080,413 | 3/1978 | Layden et al. | 423/447.6 X |
| 4,115,626 | 9/1978 | Sauer et al. | 429/27 |
| 4,250,231 | 2/1981 | Maru | 429/13 |
| 4,540,678 | 9/1985 | Sutt | 423/449 X |
| 4,601,887 | 7/1986 | Dorn et al. | 423/460 X |

FOREIGN PATENT DOCUMENTS 58-5972  1/1983  Japan .................................. 502/101

OTHER PUBLICATIONS

Kinoshita, *Carbon, Electrochemical and Physiochemical Properties*; New York et al, John Wiley and Sons, Inc. 1988, pp. 5≠6.

Primary Examiner—Stephen J. Kalafut
Attorney, Agent, or Firm—L. E. Carnahan; Roger S. Gaither; William R. Moser

[57] ABSTRACT

A novel carbonaceous electrode support material is disclosed characterized by a corrosion rate of 0.03 wt. %/hour or less when measured a5 550 millivolts vs. a Hg/HgO electrode in a 30 wt. % KOH electrolyte a5 30° C. The electrode support material comprises a preselected carbon black material which has been heat-treated by heating the material to a temperature of from about 2500° to about 3000° C. over a period of from about 1 to about 5 hours in an inert atmosphere and then maintaining the preselected carbon black material at this temperature for a period of at least about 1 hour, and preferably about 2 hours, in the inert atmosphere.

A carbonaceous electrode suitable for use as an air electrode in a metal-air cell may be made from the electrode support material by shaping and forming it into a catalyst support and then impregnating it with a catalytically active material capable of catalyzing the reaction with oxygen at the air electrode of metal-air cell.

25 Claims, 2 Drawing Sheets

```
┌─────────────────────────────────┐
│   PRESELECTING A CARBON BLACK    │
│ MATERIAL CAPABLE OF FORMING A   │
│   LOW-CORROSION CARBONACEOUS     │
│       ELECTRODE SUPPORT          │
└─────────────────────────────────┘
                 │
┌─────────────────────────────────┐
│  HEATING THE CARBON BLACK UP     │
│    TO A TEMPERATURE OF FROM      │
│  ABOUT 2500 TO ABOUT 3000°C      │
│   IN FROM ABOUT 1 TO 5 HOURS     │
└─────────────────────────────────┘
                 │
┌─────────────────────────────────┐
│   MAINTAINING THE CARBON BLACK   │
│       AT THE HEAT TREATMENT      │
│  TEMPERATURE FOR A PERIOD OF     │
│     AT LEAST ABOUT 1 HOUR        │
└─────────────────────────────────┘
                 │
┌─────────────────────────────────┐
│      COOLING THE HEAT TREATED    │
│      CARBON BLACK AT A RATE OF   │
│   NOT MORE THAN 10°C PER MINUTE  │
│   DOWN TO AMBIENT TEMPERATURE    │
└─────────────────────────────────┘
```

FIG. 1

NOVEL AIR ELECTRODE FOR METAL-AIR BATTERY WITH NEW CARBON MATERIAL AND METHOD OF MAKING SAME

BACKGROUND OF THE INVENTION

The Government has rights in this invention pursuant to Contract No. DE-AC03-76SF00098 between the United States Department of Energy and the University of California.

This invention relates to a rechargeable battery or fuel cell. More particularly, this invention relates to a novel air electrode comprising a new carbon electrode support material and a method of making same.

The current technology of air electrodes for electrically rechargeable metal-air batteries or fuel cells has resulted in the formation of air electrodes with very limited cycle life, typically about 300 cycles, due to intrinsic limitations in the lifetime of the materials currently in use. In order to maximize the effectiveness of the materials used as catalysts for the reduction/evolution of oxygen, the catalytic materials, typically one or more transition metal oxides, are dispersed onto a conducting support material in order to maximize the surface area and minimize the rate of reagglomeration of the active material.

The support material should have high electrical conductivity, high surface area, low density, and very high chemical stability (corrosion resistance). These properties are hard to find in a single material Historically, however, carbon blacks have been found to meet most of the requirements, having high conductivity, high surface area, and low density.

The use of carbonaceous material as a support for an electrode is described in DeCrescente et al U.S. Pat. No. 4,064,207 and Layden et al U.S. Pat. No. 4,080,413. Both patents describe the formation of sheets of organic fibers which are subsequently pyrolyzed to form a porous carbon substrate for use in a fuel cell electrode.

Talvenheimo U.S. Pat. No. 3,158,510 describes the production of a porous carbon support for utilization as either a catalytic fuel electrode or oxygen electrode of a fuel cell by laminating together layers respectively formed from baked carbon and activated carbon.

However, one of the disadvantages of the use of carbon, such as carbon black, in electrodes such as air electrodes for electrically rechargeable metal-air batteries or fuel cells, resides in the inability of such electrodes to sufficiently resist corrosion to permit their use in applications requiring a significant number of recharging cycles, e.g., 1000 cycles or more. Maru U.S. Pat. No. 4,250,231 recognized the problem of corrosion associated with the use of carbon electrodes in a fuel cell and proposed as a solution the addition of carbon dioxide gas to the cell to inhibit such corrosion.

Bonnemay et al U.S. Pat. No. 3,870,565 observed that activated carbon electrodes used in a reversible zinc-air type cell suffered from a major disadvantage in that their discharge power density decreases at a very fast rate after they have been made to function anodically, i.e., recharging of the reversible cell. They proposed to alleviate this problem by using a carbon black consisting of a chain of substantially spherical particles which had been thermochemically treated either in a chlorine atmosphere at a temperature of about 1800° C. or in a chlorine atmosphere at from 1500° to 2000° C. followed by heating in an inert atmosphere within the range of 2000° to 3000° C.

The particular type of activated carbon used by Bonnemay et al was further characterized by them as having a structure determined by x-ray diffraction to have atoms located in parallel planes such that the inter-plane distance C/2 is within the range of 3.35Å to 3.55Å approximately, the mean thickness of the crystal domains at right angles to the planes aforesaid being substantially within the range of 10 to 100Å, with the crystal structure being consequently close to graphite, but with the graphitic planes displaced with respect to those of graphite.

While this high temperature treatment in a chlorine atmosphere is said to result in the formation of a carbon electrode having a discharge current which remains stable after 300 discharge cycles, present requirements for batteries suitable for use, for example, in electric vehicles, is the ability to provide 1000 or more 8 hour cycles. Furthermore, the high temperature treatment of a carbon black in a chlorine environment is not desirable due to the corrosive nature of such a process upon the apparatus employed in the process.

It would, therefore be desirable to provide an electrode having a carbon electrode support which may be used, for example, as an air electrode in a metal-air battery, which possesses high electrical conductivity, high surface area, low density, as well as very high chemical stability or corrosion resistance. It would further be desirable if such an electrode could be produced from a carbon source such as a carbon black without the need to subject the material to a corrosive high temperature chlorine treatment.

SUMMARY OF THE INVENTION

It is, therefore, an object of this invention to provide a carbon electrode support material, suitable for use in an air electrode for a battery or fuel cell, including a rechargeable battery, comprising a heat-treated preselected carbon black material exhibiting high electrical conductivity, high surface area, low density, and very high chemical stability or corrosion resistance.

It is another object of this invention to provide a carbon electrode support, suitable for use in an air electrode in a battery or fuel cell, including a rechargeable battery, comprising a heat-treated preselected carbon black material exhibiting high electrical conductivity, high surface area, low density, and very high chemical stability or corrosion resistance wherein the heat treatment consists of a high temperature treatment in an inert atmosphere.

It is yet another object of this invention to provide a carbon electrode support, suitable for use in an air electrode in a battery or fuel cell, including a rechargeable battery, comprising a preselected carbon black material which has been subjected to a high temperature treatment in an inert atmosphere and is characterized by a surface area greater than 20 meters$^2$/gram (m$^2$/g) and a corrosion rate not exceeding 0.03% weight loss per hour at 550 millivolts vs. a Hg/HgO electrode in 30% KOH at 45 ° C.

It is still another object of this invention to provide a carbon electrode support, suitable for use in an air electrode in a battery or fuel cell, including a rechargeable battery, comprising a preselected furnace-process carbon black comprising carbon particles agglomerated and highly fused together into aggregates of approximately spherical outline in an electron microscope and having a homogeneous distribution of the size of the aggregates with substantially all of the aggregates being larger than 50 nanometers (nm) and smaller than 75 nm.

It is yet another object of this invention to provide a carbon electrode support, suitable for use in an air electrode of a battery or fuel cell, including a rechargeable battery, and characterized by a corrosion rate not exceeding 0.03% weight loss per hour at 550 millivolts vs. a Hg/HgO electrode in 30 wt.% KOH at 45° C., characterized by high electrical conductivity, high surface area, low density, and very high chemical stability or corrosion resistance comprising a preselected form of carbon black material which has been subjected to a heat treatment in an inert atmosphere for from about 1 to about 4 hours at a temperature of from about 2500° to about 3000° C.

It is a further object of this invention to provide an electrode, suitable for use in a battery or fuel cell, including a rechargeable battery, using a carbon support exhibiting high electrical conductivity, high surface area, high porosity, and very high chemical stability or corrosion resistance comprising a preselected carbon black material which has been subjected to high temperature treatment in an inert atmosphere.

It is yet a further object of this invention to provide a process for producing a carbon support for an electrode suitable for use in a battery or fuel cell, including a rechargeable battery, exhibiting high electrical conductivity, high surface area, low density, and very high chemical stability or corrosion resistance, and further characterized by a corrosion rate not exceeding 0.03% weight loss per hour at 550 millivolts vs. a Hg/HgO electrode in 30 wt.% KOH at 45° C.

These and other objects of this invention will become apparent from the following description and accompanying drawings.

BRIEF DESCRIPTION OF THE DRAWINGS

FIG. 1 is a flow sheet illustrating the process of the invention for producing the novel carbon black electrode support of the invention.

DETAILED DESCRIPTION OF THE INVENTION

Figure 3:
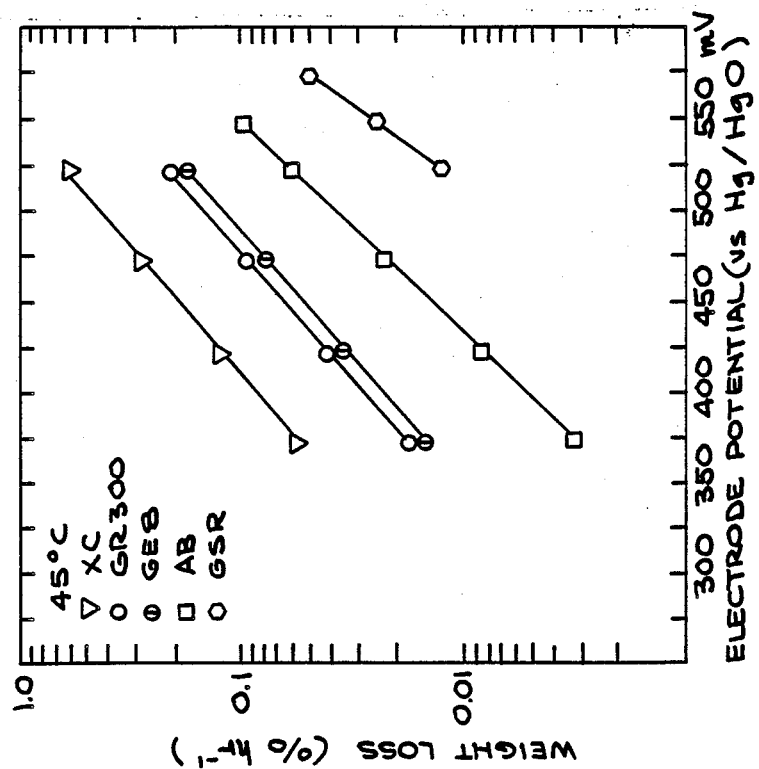
FIG. 3 is a graph illustrating the oxygen evolution rate as a function of electrode potential for an electrode of the invention versus an electrode produced using a carbon support not processed in accordance with the invention.

In accordance with the invention, an improved carbon electrode support, and an electrode made from same and suitable for use as an air electrode for a rechargeable metal-air battery or cell, are provided having enhanced corrosion resistance. The terms "cell" and "battery" are interchangeably used herein and are both broadly intended to mean at least one metal electrode and at least one air electrode rather than the more restricted definition of a cell as including only a single negative electrode and a single positive electrode with a battery comprising two or more cells.

The improved carbon electrode support, and the electrode made from such a support, are made by preselecting a particular form of carbon and then heat treating it in accordance with the invention.

The carbon useful in producing the improved carbon electrode of the invention comprises a particular form of carbon which may be defined as a furnace-process carbon black comprising carbon particles agglomerated and highly fused together into aggregates of approximately spherical outline in an electron microscope. The furnace-process carbon black of the invention further comprises a homogeneous distribution of the size of the aggregates with substantially all of the aggregates being larger than 50 nanometers (nm) and smaller than 75 nm.

A "furnace-process" carbon black may be further defined as a carbon black which has been formed from oil which has been atomized into the hot zone of a furnace heated to about 1400° C. by auxiliary heating means to form the particles of carbon black. This is in contrast to an acetylene black, for example, which is formed by the thermal decomposition of acetylene into carbon black and hydrogen which releases exothermic heat causing the temperature to rise to as high as 1800° C. These processes for forming the various carbon blacks are discussed by Kim Kinoshita on pages 5-6 of "Carbon, Electrochemical and Physicochemical Properties", published by John Wiley and Sons, New York, 1988.

Particular commercially available carbon black materials which have been found to possess the above described characteristics include the low color furnace blacks having the industry designation LCF-1 to 4 or a rubber-grade carbon black of the semi-reinforcing type, such as ASTM D1765 classification N774 (industry classification SRF). Examples of such preselected carbon black materials include Cabot Sterling R, Cabot Vulcan 3, and Cabot Regal SRF. The term "preselected carbon black material", as used hereinafter, will refer to carbon black material which meets the above discussed criteria and is, therefore, useful in the practice of the invention.

While the carbon black used in forming the electrode of the invention must possess the afore described characteristics, it must also be further processed to provide the desired degree of corrosion resistance. In accordance with the invention, the particular preselected carbon black material must be heat-treated by heating it to a temperature of from about 2500° to about 3000° C., preferably about 2700° to about 2900° C., and most preferably about 2750° to about 2850° C., over a time period of from about 1 to 5 hours, preferably from at least about 1 to about 3 hours, and most preferably at least about 2 hours.

Once the preselected carbon black material reaches the treatment temperature, it is maintained at this temperature for a period of at least about 1 hour, and preferably from at least about 2 to about 4 hours. The preselected carbon black material may be maintained at the treatment temperature for longer periods of time, if desired, but such may not be necessary. The heat-treated preselected carbon black material is then cooled at a rate not exceeding about 10° C. per minute down to room temperature, i.e., about 25° C.

The heat-treated preselected carbon black electrode support material of the invention has a surface area of from at least about 20 meter$^2$/gram (m$^2$/g) up to about 200 m$^2$/g, preferably from about 20 to about 70 m$^2$/g. The structure of the heat-treated preselected carbon black should have an x-ray diffraction pattern that indicates that the c-axis layer plane spacing has been decreased to below 0.342 nm and that the characteristic dimensions $L_a$ and $L_c$ (as defined by Warren in Proceedings of the First and Second Conferences on Carbon, Waverly Press, Baltimore, MD, 1956, pp. 49-58) should both be at least 10 nm.

To prevent oxidation of the preselected carbon black material during the heat treatment, the carbon is maintained in an inert atmosphere such as helium, neon, or argon, i.e. an atmosphere which will neither react with the carbonaceous support material nor any of the apparatus used in the heat treatment. The terms "inert gas" and "inert atmosphere", as used herein, are, therefore, intended to include any Group VIII elements in the periodic chart of the elements.

The preselected carbon black material, when processed in accordance with the invention, should have a corrosion rate measured as a weight loss of 0.03 wt.% or less per hour when maintained at 550 millivolts vs. a Hg/HgO electrode at 45° C. in a 30 wt.% KOH electrolyte. This corrosion rate is nearly an order of magnitude better than the most corrosion resistant carbon black of comparable surface area, Shawinigan Acetylene Black, of the Gulf Oil subsidiary of Chevron, Inc. It should be noted in this regard, that the heat treatment process of the invention is not solely responsible for the marked increase in corrosion resistance. As will be shown hereinafter, some other carbon blacks, of comparable surface area, when heat-treated in the same manner, exhibit corrosion rates as much as 50 times that of the preselected carbon black material of the invention.

The preselected and heat-treated carbon black electrode support material is then mixed with a hydrophobic inert binder material such as particulated polytetrafluoroethylene, or polyethylene in a ratio of about 60 to about 80 wt.% carbon black with the balance consisting of binder material. The mixture is pressed into the desired electrode shape at a pressure of about 40 to about 60 kg/cm². The thickness of the electrode support may vary from as thin as 0.1 mm to as thick as 1 mm.

The shaped electrode support is then heated to a temperature of about 250°-350° C. in a non-reactive atmosphere, such as nitrogen or argon, and then maintained at this temperature for a period of from about 1 to about 3 hours, preferably at least about 2 hours, to sinter the carbon black and the binder particles together. Depending upon the melting point of the binder selected, the sintering temperature may be raised or lowered as needed. However, the sintering temperature should not exceed about 350° C.

The sintered carbon black electrode support is now impregnated with a catalytically active material capable of catalyzing the desired half cell charge and discharge reactions at the air electrode of a metal-air cell which may be represented by the equations:

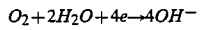

$$O_2 + 2H_2O + 4e \rightarrow 4OH^-$$

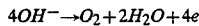

$$4OH^- \rightarrow O_2 + 2H_2O + 4e$$

Such catalytic materials include transition metal oxides, perovskites, or spinels, such as, for example, NiO, $Co_3O_4$, or $NiCoO_4$. Precious metals, including silver, gold and one of the six platinum metals (or mixtures thereof) may also be used, but are not necessary and, therefore, in view of their added cost, are not preferred catalytic materials. By the term "transition metals" is meant elements 21 through 29, 39-47, AND 57-79.

To further illustrate the invention, a preselected carbon black material, Cabot Sterling R (GSR), having a particle size range of from 50 to 75 nm and an average surface area of 25 m²/g, and having the previously described physical characteristics, was heat-treated by gradually heating the carbon black material to 2800° C. over a period of about 400 minutes and then maintaining the carbon at this temperature of about 1 hour. The heat-treated carbon was then cooled at a rate of approximately 10° C. per minute back to ambient temperature, i.e., about 25° C.

The same heat treatment was given to 2 other commercially available carbon blacks, Cabot Regal 300 (GR300) and Cabot Elftex 8 (GE8), of comparable particle size and surface area. These three heat-treated carbon blacks, together with two additional untreated carbon black materials, Cabot Vulcan XC-72R (XC) and Gulf Shawinigan Acetylene Black (AB), were then formed into electrode supports by mixing each carbon black with 30 wt.% polytetrafluoroethylene powder and then pressing the respective mixtures at 500 kg/cm² into 5×5 cm plates having a thickness of approximately 2 mm. The electrode plates were then sintered at a temperature of approximately 300° C. for about 20 minutes.

The electrodes were then each tested for corrosion resistance by immersing the electrode into a 30 wt.% KOH electrolyte at 45° C. Various potentials were then applied between the electrode and a Hg/HgO counter electrode, with polarity selected such that the carbon electrodes functioned as anodes, i.e., at these electrodes the half cell reaction was: $4OH^- \rightarrow O_2 + 2H_2O + 4e^-$.

The results are plotted in FIG. 3. It will be seen that there is a marked difference in weight loss, i.e., corrosion, between the preselected carbon black material of the invention and the other carbon materials tested in comparison.

Electrode supports were also formed and tested for corrosion using Gulf Shawinigan Acetylene Black carbon black material heat treated in the same manner as the preselected carbon black electrode material of the invention. The corrosion resistance of the acetylene black material, which is formed at a higher temperature than the preselected carbon black material of the invention, did not materially improve when subjected to the heat treatment of the invention.

Figure 2:
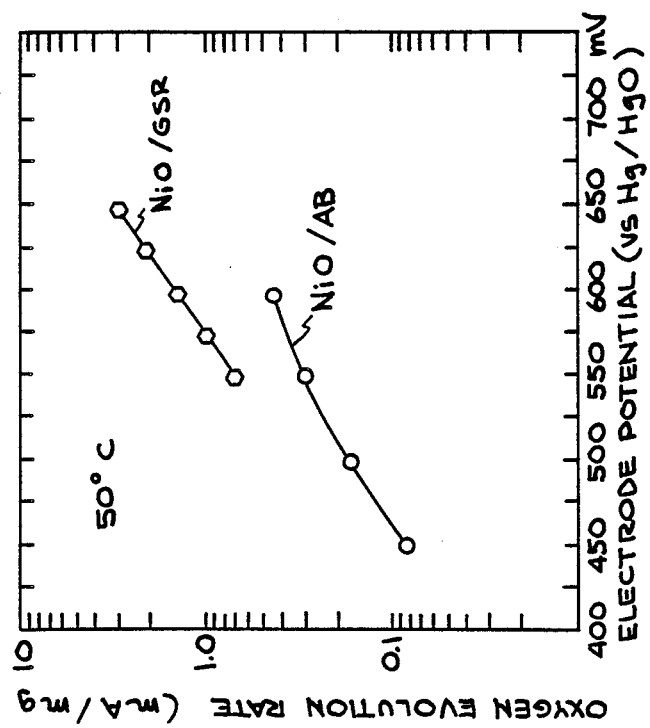
FIG. 2 is a graph illustrating comparative weight losses plotted against electrode potential for the electrode of the invention versus electrodes produced using other carbon supports.

To further illustrate the invention, the GSR carbon of the invention and the AB carbon (Gulf Shawinigan Acetylene Black) representing the prior art, were catalyzed with NiO using a method described by Stand and Ross, J. Electrochem. Soc., 133 (1986) at p. 1079. The catalyzed carbons were then fabricated into electrodes, as previously described, and each electrode was measured for oxygen evolution at several voltages in a cell having a 30 wt. % KOH electrolyte and a Hg/HgO counter electrode and maintained at 50° C. The results are plotted in FIG. 2 where the oxygen evolution, i.e., the efficiency of the electrode, at various voltages is shown to be much higher for the electrode formed in accordance with the invention.

Thus, an electrode formed from a carbon black electrode support material, comprising preselected carbon black material heat-treated in an inert atmosphere at a temperature of from about 2500° to about 3000° C., possesses the desired corrosion resistance while also providing the required efficiency for an air electrode in a metal-air cell.

While a specific embodiment of the carbon electrode and method for making the electrode has been illustrated and described in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. A corrosion-resistant carbonaceous electrode support material characterized by a corrosion rate of 0.03 wt.%/hour or less when measured at 550 millivolts vs. a Hg/HgO electrode in a 30 wt.% KOH electrolyte at 30° C., comprising a furnace-process carbon black material which has been heat-treated by heating the material to a temperature of from about 2500° to about 3000° C. over a period of from about 1 to about 5 hours in an inert atmosphere and maintained at this temperature for a period of at least about 1 hour in said inert atmosphere.

2. The carbonaceous electrode support material of claim 1 wherein said preselected carbon black material is maintained at said heat treatment temperature from at least about 2 to about 4 hours.

3. The carbonaceous electrode support material of claim 1 wherein said preselected carbon black material is heated to a temperature of from about 2500° to about 3000° C. over a period of from about 5 to about 8 hours.

4. The carbonaceous electrode support material of claim 3 wherein said preselected carbon black material is heated to a temperature of from about 2500° to about 3000° C. over a period of at least about 6 hours.

5. The carbonaceous electrode support material of claim 1 wherein said preselected carbon black material is heated to a temperature of from about 2700° to about 2900° C.

6. The carbonaceous electrode support material of claim 5 wherein said preselected carbon black material is heated to a temperature of from about 2750° to about 2850° C.

7. The carbonaceous electrode support material of claim 1 wherein said preselected carbon black material, after said heat treatment, is cooled at a rate not exceeding about 10° C. per minute.

8. The carbonaceous electrode support material of claim 7 wherein said preselected carbon black material, after said heat treatment, is cooled at a rate not exceeding about 10° C. per minute down to about 25° C.

9. The carbonaceous electrode support material of claim 1 wherein the inert atmosphere in which said preselected carbon black material is maintained during said entire heat treatment consists essentially of a gas selected from the group consisting of at least one Group VIII element, nitrogen, or a mixture of two or more of said gases.

10. The carbonaceous electrode support material of claim 1 wherein said furnace-process carbon black material is selected from the class consisting one or more low color furnace blacks having the industry designation LCF-1 to 4 and a rubber-grade carbon black of the semi-reinforcing type having the ASTM D1765 classification N774 and the industry classification SRF.

11. A corrosion-resistant carbonaceous electrode support material characterized by a corrosion rate of 0.03 wt.%/hour or less when measured at 550 millivolts vs. a Hg/HgO electrode in a 30 wt.% KOH electrolyte at 30° C., comprising a furnace-process carbon black material which has been heat-treated by heating the material to a temperature of from about 2750° to about 2850° C. over a period of at least about 6 hours in an inert atmosphere consisting essentially of a gas selected from the group consisting of at least one Group VIII element, nitrogen, or a mixture of two or more of said gases, maintained at this temperature for a period of at least about 1 to about 2 hours in said inert atmosphere, and then cooled at a rate not exceeding about 10° C. per minute.

12. A corrosion-resistant carbonaceous electrode suitable for use as an air electrode in a metal-air cell, and characterized by a corrosion rate of 0.03 wt.%/hour or less when measured at 550 millivolts vs. a Hg/HgO electrode in a 30 wt.% KOH electrolyte at 30° C, comprising a furnace-process carbon black support material, characterized by carbon particles agglomerated into aggregates of approximately spherical outline with substantially all of the aggregates being larger than 50 nanometers (nm) and smaller than 75 nm, which support material has been heat-treated by heating the material to a temperature of from about 2500° to about 3000° C. over a period of from about 3 to about 10 hours; maintained at this temperature for a period of at least about 1 hour in an inert atmosphere; shaped and formed into an electrode support; and impregnated with a catalytically active material capable of catalyzing the reaction with oxygen at the air electrode of a metal-air cell.

13. The carbonaceous air electrode of claim 12 wherein said preselected carbon black support material is heat-treated by heating the material to a temperature of from about 2700° to about 2900° C. over a period of from about 5 to about 8 hours; maintained at this temperature for a period of at least about 1 hour in an inert atmosphere; and then mixed with a binder material in a ratio of about 60 to about 80 wt.% of said preselected carbon black material with the balance consisting essentially of said binder material prior to being shaped and formed into said electrode support and impregnated with said catalytically active material.

14. The carbonaceous air electrode of claim 13 wherein said mixture of said preselected carbon black support material and said binder is sintered at a temperature of about 250° to 350° C. for a period of from about 1 to about 3 hours in a non-reactive atmosphere to form said electrode support.

15. A method of forming a carbonaceous electrode support material characterized by a corrosion rate of 0.03 wt.%/hour or less when measured at 550 millivolts vs. a Hg/HgO electrode in a 30 wt.% KOH electrolyte at 30° C., which comprises:

(a) preselecting a carbon black material comprising a furnace-process carbon black comprising carbon particles agglomerated into aggregates larger than 50 nanometers (nm) and smaller than 75 nm; and (b) heat treating said preselected carbon black material in an inert atmosphere by:

(i) heating the material to a temperature of from about 2500° to about 3000° C. over a period of from about 4 to about 8 hours; and (ii) maintaining the preselected material at this temperature for a period of at least about 1 hour while maintaining said inert atmosphere.

16. The method of claim 15 including the further step of cooing said heat-treated preselected carbon black material at a rate not exceeding about 10° C. per minute.

17. The method of claim 16 wherein said cooling rate is continued until the material is cooled to about 25° C.

18. The method of claim 15 wherein said step of maintaining said preselected carbon black material at said heat treatment temperature further comprises maintaining said preselected carbon black material at said temperature for from at least about 2 to about 4 hours.

19. The method of claim 15 wherein said step of heating said preselected carbon black material to a temperature of from about 2500° to about 3000° C. further comprises heating said preselected carbon black material up to said heat treatment temperature over a period of from about 5 to about 8 hours.

20. The method of claim 19 wherein said step of heating said preselected carbon black material to a temperature of from about 2500° to about 3000° C. further comprises heating said preselected carbon black material up to said heat treatment temperature over a period of at least about 6 hours.

21. The method of claim 15 wherein said step of heating said preselected carbon black material up to said heat treatment temperature further comprises heating said preselected carbon black material up to a heat treatment temperature of from about 2700° to about 2900° C.

22. The method of claim 21 wherein said step of heating said preselected carbon black material up to said heat treatment temperature further comprises heating said preselected carbon black material up to a heat treatment temperature of from about 2750° to about 2850° C.

23. The method of claim 15 wherein said step of heating said preselected carbon black material in an inert atmosphere and then maintaining said inert atmosphere during said heat treatment further comprises maintaining an inert atmosphere consisting essentially of at least one Group VIII element.

24. A method of forming a carbonaceous electrode support material characterized by a corrosion rate of 0.03 wt.%/hour or less when measured at 550 millivolts vs. a Hg/HgO electrode in a 30 wt.% KOH electrolyte at 30° C., which comprises:

(a) preselecting a carbon black material comprising a furnace-process carbon black comprising carbon particles agglomerated and highly fused together into aggregates of approximately spherical outline with a homogeneous distribution of the size of the aggregates and with substantially all of the aggregates being larger than 50 nanometers (nm) and smaller than 75 nm;

(b) heat treating said preselected carbon black material in a inert atmosphere consisting essentially of at least one Group VIII element by:
 (i) heating the material to a temperature of from about 2500° to about 3000° C. over a period of from about 4 to about 8 hours; and
 (ii) maintaining the preselected material at this temperature for a period of at least about 2 to about 4 hours while maintaining said inert atmosphere; and (c) cooling said heat-treated preselected carbon black material at a rate not exceeding about 10° C. per minute.

25. A carbonaceous electrode support material characterized by a corrosion rate of 0.03 wt.%/hour or less when measured at 550 millivolts vs. a Hg/HgO electrode in a 30 wt.% KOH electrolyte at 30° C., comprising a furnace-process carbon black comprising carbon particles agglomerated and highly fused together into aggregates of approximately spherical outline with a homogeneous distribution of the size of the aggregates and with substantially all of the aggregates being larger than 50 nanometers (nm) and smaller than 75 nm, and which has been heat-treated by heating the material to a temperature of from about 2500° to about 3000° C. over a period of from about 1 to about 5 hours in an inert atmosphere and maintained at this temperature for a period of at least about 1 hour in said inert atmosphere.

* * * * *